United States Patent
Zhao et al.

(10) Patent No.: US 12,096,401 B2
(45) Date of Patent: Sep. 17, 2024

(54) RESOURCE SHARING METHOD AND APPARATUS, AND TERMINAL DEVICE

(71) Applicant: GUANGDONG OPPO MOBILE TELECOMMUNICATIONS CORP., LTD., Dongguan (CN)

(72) Inventors: Zhenshan Zhao, Dongguan (CN); Qianxi Lu, Dongguan (CN); Huei-Ming Lin, Victoria (AU)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 366 days.

(21) Appl. No.: 17/557,810

(22) Filed: Dec. 21, 2021

(65) Prior Publication Data

US 2022/0116917 A1 Apr. 14, 2022

Related U.S. Application Data

(63) Continuation of application No. PCT/CN2019/096182, filed on Jul. 16, 2019.

(51) Int. Cl.
*H04W 72/02* (2009.01)
*H04W 28/26* (2009.01)
*H04W 72/044* (2023.01)
*H04W 72/20* (2023.01)
*H04W 76/30* (2018.01)

(52) U.S. Cl.
CPC ........... *H04W 72/02* (2013.01); *H04W 28/26* (2013.01); *H04W 72/044* (2013.01); *H04W 72/20* (2023.01); *H04W 76/30* (2018.02)

(58) Field of Classification Search
CPC ..... H04W 72/02; H04W 76/30; H04W 72/20; H04W 28/26; H04W 72/044
See application file for complete search history.

(56) References Cited

U.S. PATENT DOCUMENTS 10,932,231 B2 * 2/2021 Zhao .................. H04W 72/541
11,215,715 B2 * 1/2022 Chae .................. H04W 64/003
(Continued)

FOREIGN PATENT DOCUMENTS

CN 108810906 A 11/2018
CN 109644436 A 4/2019
(Continued)

OTHER PUBLICATIONS

English translation for WO_2018166508_A1_Luo (Year: 2018).*
(Continued)

*Primary Examiner* — Chi H Pham
*Assistant Examiner* — Weibin Huang
(74) *Attorney, Agent, or Firm* — Sheppard, Mullin, Richter & Hampton LLP

(57) ABSTRACT

The embodiments of the present disclosure provide a resource sharing method and apparatus, and a terminal device. The method includes: receiving, by a first terminal device, first configuration information transmitted by a network device, the first configuration information being used to configure one or more first sidelink transmission resources; and transmitting, by the first terminal device, first indication information on a sidelink, the first indication information being used to determine the one or more first sidelink transmission resources.

7 Claims, 8 Drawing Sheets

Receive, by a first terminal device, first configuration information transmitted by a network device, the first configuration information being used to configure one or more first sidelink transmission resources — 301

Transmit, by the first terminal device, first indication information on a sidelink, the first indication information being used to determine the one or more first sidelink transmission resources — 302

(56) References Cited

U.S. PATENT DOCUMENTS

| | | | | |
|---|---|---|---|---|
| 2018/0098323 A1* | 4/2018 | Zhang | ....................... | H04L 5/00 |
| 2019/0254059 A1* | 8/2019 | Gulati | ................. | H04W 72/542 |
| 2020/0068609 A1* | 2/2020 | Wang | ................... | H04W 72/02 |
| 2020/0374859 A1* | 11/2020 | Han | ...................... | H04W 72/02 |
| 2021/0337514 A1* | 10/2021 | Xiang | .................. | H04W 72/20 |
| 2022/0124562 A1* | 4/2022 | Yu | ........................ | H04W 72/20 |

FOREIGN PATENT DOCUMENTS

| | | | | |
|---|---|---|---|---|
| CN | 109803431 A | 5/2019 | | |
| WO | WO-2018166508 A1 * | 9/2018 | ............. | H04L 29/02 |

OTHER PUBLICATIONS

International Search Report and Written Opinion dated Apr. 15, 2020 in International Application No. PCT/CN2019/096182. English translation is attached.

* cited by examiner

ND APPARATUS, AND TERMINAL DEVICE

RESOURCE SHARING METHOD AND APPARATUS, AND TERMINAL DEVICE

CROSS-REFERENCE TO RELATED APPLICATIONS

The present application is a continuation of International Application No. PCT/CN2019/096182 filed on Jul. 16, 2019, which is hereby incorporated by reference in its entirety.

TECHNICAL FIELD

The embodiments of the present disclosure relate to mobile communication technology, and more particularly, to a resource sharing method and apparatus, and a terminal device.

BACKGROUND

Device to Device (D2D) communication is based on Sidelink (SL) transmission technology. Unlike traditional cellular systems in which communication data is received or transmitted via base stations, a Vehicle to Everything (V2X) system uses D2D communication (i.e., direct D2D communication), thereby having higher spectral efficiency and lower transmission delay. For the D2D communication, there are two transmission modes: a first mode and a second mode. In the first mode, a network device allocates transmission resources to a terminal device, while in the second mode, a terminal device selects transmission resources. When the first mode and the second mode share a resource pool, transmission resources for terminals in the first mode and transmission resources for terminals in the second mode may collide with each other.

SUMMARY

The embodiments of the present disclosure provide a resource sharing method and apparatus, and a terminal device.

A resource sharing method is provided according to an embodiment of the present disclosure. The method includes: receiving, by a first terminal device, first configuration information transmitted by a network device, the first configuration information being used to configure one or more first sidelink transmission resources; and transmitting, by the first terminal device, first indication information on a sidelink, the first indication information being used to determine the one or more first sidelink transmission resources.

A resource sharing method is provided according to an embodiment of the present disclosure. The method includes: receiving, by the first terminal device, first configuration information transmitted by a network device, the first configuration information being used to configure one or more first sidelink transmission resources; and transmitting, by the first terminal device, resource reservation indication information on a sidelink, the resource reservation indication information being used to indicate that the one or more first sidelink transmission resources are reserved by the first terminal device.

A resource sharing apparatus is provided according to an embodiment of the present disclosure. The apparatus includes: a receiving unit configured to receive first configuration information transmitted by a network device, the first configuration information being used to configure one or more first sidelink transmission resources; and a transmitting unit configured to transmit first indication information on a sidelink, the first indication information being used to determine the one or more first sidelink transmission resources.

A resource sharing apparatus is provided according to an embodiment of the present disclosure. The apparatus includes: a receiving unit configured to receive first configuration information transmitted by a network device, the first configuration information being used to configure one or more first sidelink transmission resources; and a transmitting unit configured to transmit resource reservation indication information on a sidelink, the resource reservation indication information being used to indicate that the one or more first sidelink transmission resources are reserved by the first terminal device.

A terminal device is provided according to an embodiment of the present disclosure. The terminal device includes a processor and a memory. The memory is configured to store a computer program, and the processor is configured to invoke and execute the computer program stored in the memory to perform the above resource sharing method.

A chip is provided according to an embodiment of the present disclosure, for implementing the above resource sharing method.

In particular, the chip includes a processor configured to invoke and execute a computer program from a memory, to enable a device provided with the chip to perform the above resource sharing method.

A computer-readable storage medium is provided according to an embodiment of the present disclosure. The computer-readable storage medium is configured to store a computer program that enables a computer to perform the above resource sharing method.

A computer program product is provided according to an embodiment of the present disclosure. The computer program product includes computer program instructions that enables a computer to perform the above resource sharing method.

A computer program is provided according to an embodiment of the present disclosure. The computer program, when executed on a computer, causes the computer to perform the above resource sharing method.

With the above technical solutions, a first terminal device signals a first sidelink transmission resource allocated by a network device via first indication information, such that other terminal devices can obtain the first sidelink transmission resource of the first terminal device. In this way, the other terminal devices can avoid using the first sidelink transmission resource, thereby avoiding interference between the other terminal devices and the first terminal device. On the other hand, when the first terminal device transmits sidelink data on a sidelink, regardless of whether the sidelink data is for a periodic service or an aperiodic service, it can transmit resource reservation indication information to indicate that the first terminal device has reserved subsequent sidelink transmission resources. In response to detecting the resource reservation indication information, other terminal devices can avoid using the sidelink transmission resources reserved by the first terminal device, thereby avoiding interference between the other terminal devices and the first terminal device.

BRIEF DESCRIPTION OF DRAWINGS

The figures described here are used to provide a further understanding of the present disclosure and constitute a part of the present disclosure. The exemplary embodiments of the present disclosure and description thereof are used to explain the present disclosure, and do not constitute an improper limitation of the present disclosure. In the figures.

DESCRIPTION OF EMBODIMENTS

The technical solutions in the embodiments of the present disclosure will be described below with reference to the figures in the embodiments of the present disclosure. Obviously, the described embodiments are only some embodiments, rather than all embodiments of the present disclosure. All other embodiments obtained by those skilled in the art based on the embodiments in the present disclosure without inventive efforts are to be encompassed by the scope of the present disclosure.

The technical solutions according to the embodiments of the present disclosure can be applied to various communication systems, including for example: Global System of Mobile Communication (GSM), Code Division Multiple Access (CDMA) system, Wideband Code Division Multiple Access (WCDMA) system, General Packet Radio Service (GPRS), Long Term Evolution (LTE) system, LTE Frequency Division Duplex (FDD) system, LTE Time Division Duplex (TDD) system, Universal Mobile Telecommunication System (UMTS), Worldwide Interoperability for Microwave Access (WiMAX) communication system, or the $5^{th}$ Generation (5G) communication system.

Figure 1:
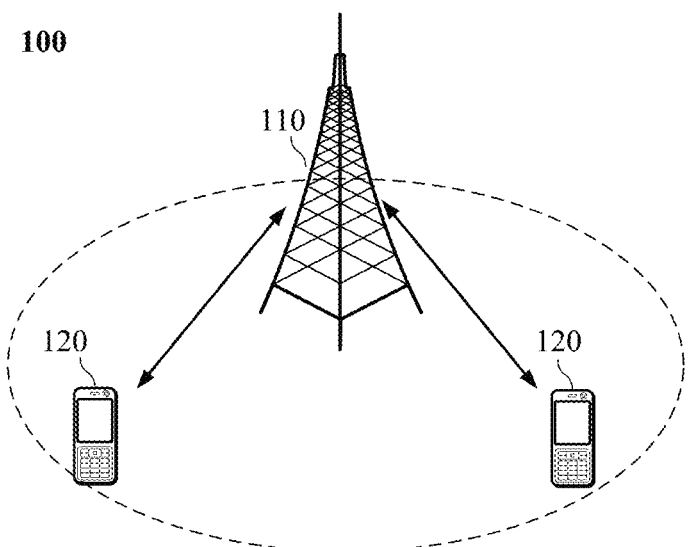
FIG. 1 is a schematic diagram showing a communication system architecture according to an embodiment of the present disclosure.

A communication system 100 where an embodiment of the present disclosure can be applied is exemplarily shown in FIG. 1. The communication system 100 may include a network device 110. The network device 110 may be a device that can communicate with a terminal device (or referred to as communication terminal or terminal) 120. The network device 110 may provide communication coverage for a particular geographic area, and may communicate with terminal devices located in the coverage area. Optionally, the network device 110 may be a base station such as Base Transceiver Station (BTS) in a GSM system or a CDMA system, a base station such as NodeB (NB) in a WCDMA system, a base station such as Evolutional Node (eNB or eNodeB) in an LTE system, a gNB in a New Radio (NR) system, or a radio controller in a Cloud Radio Access Network (CRAN). Alternatively, the network device 110 may be a mobile switch center, a relay station, an access point, a vehicle-mounted device, a wearable device, a hub, a switch, a network bridge, a router, a network side device in a 5G network, or a network device in a future evolved Public Land Mobile Network (PLMN).

The communication system 100 further includes at least one terminal device 120 located within the coverage of the network device 110. As used herein, the term "terminal device" may include, but not limited to, an apparatus connected via a wired line, e.g., via a Public Switched Telephone Network (PSTN), a Digital Subscriber Line (DSL), a digital cable, or a direct cable connection, and/or via another data connection/network, and/or via a wireless interface, e.g., for a cellular network, a Wireless Local Area Network (WLAN), a digital TV network such as a Digital Video Broadcasting-Handheld (DVB-H) network, a satellite network, an Amplitude Modulation (AM)-Frequency Modulation (FM) broadcast transmitter, and/or another terminal device, and configured to receive/transmit communication signals, and/or an Internet of Things (IoT) device. A terminal device configured to communicate via a wireless interface may be referred to as a "wireless communication terminal", a "wireless terminal", or a "mobile terminal". Examples of the mobile terminal may include, but not limited to, a satellite or cellular phone, a Personal Communications System (PCS) terminal combining cellular radio phone with data processing, fax, and data communication capabilities, a Personal Digital Assistant (PDA) including a radio phone, a pager, Internet/intranet access, a Web browser, a memo pad, a calendar, and/or a Global Positioning System (GPS) receiver, and a conventional laptop and/or palmtop receiver or another electronic device including a radio telephone transceiver. The terminal device may be an access terminal, a User Equipment (UE), a user unit, a user station, a mobile station, a mobile device, a remote station, a remote terminal, a mobile device, a user terminal, a terminal, a wireless communication device, a user agent, or a user device. Alternatively, the access terminal can be a cellular phone, a cordless phone, a Session Initiation Protocol (SIP) phone, a Wireless Local Loop (WLL) station, a Personal Digital Assistant (PDA), a handheld device or a computing device having a wireless communication function, another processing device connected to a wireless modem, a vehicle-mounted device, a wearable device, a terminal device in a 5G network, or a terminal devices in a future evolved PLMN, etc.

Optionally, direct communication, such as Device to Device (D2D) communication, may be performed between the terminal devices 120.

Optionally, the 5G system or network may also be referred to as a New Radio (NR) system or network.

FIG. 1 exemplarily shows one network device and two terminal devices. Optionally, the communication system 100 may include a plurality of network devices and the coverage of each network device may include a different number of terminal devices. The embodiment of the present disclosure is not limited to any of the examples.

Optionally, the communication system 100 may also include other network entities such as a network controller and a mobility management entity, and the embodiment of the present disclosure is not limited to any of the examples.

It can be appreciated that, in the embodiment of the present disclosure, a device with a communication function in a network/system may be referred to as a communication device. For the communication system 100 shown in FIG. 1 as an example, communication devices may include the network device 110 and the terminal devices 120, each having a communication function. The network device 110 and the terminal devices 120 may be e.g., any of the specific devices described above, and details thereof will be omitted here. The communication devices may also include other devices in the communication system 100, such as a network controller, a mobility management entity, and other network entities, and the embodiment of the present disclosure is not limited to any of the examples.

It is to be noted that the terms "system" and "network" are often used interchangeably herein. The term "and/or" as used herein only represents a relationship between correlated objects, including three relationships. For example, "A and/or B" may mean A only, B only, or both A and B. In addition, the symbol "/" as used herein represents an "or" relationship between the correlated objects preceding and succeeding the symbol.

In order to facilitate understanding of the technical solutions of the embodiments of the present disclosure, the related technologies in the embodiments of the present disclosure are described below.

Device to Device (D2D) Communication

D2D communication is based on Sidelink (SL) transmission technology. Unlike traditional cellular systems in which communication data is received or transmitted via base stations, a Vehicle to Everything (V2X) system uses D2D communication (i.e., direct D2D communication), thereby having higher spectral efficiency and lower transmission delay. For D2D communication, the 3$^{rd}$ Generation Partnership Project (3GPP) defines two transmission modes: Mode 1 (corresponding to the above first mode) and Mode 2 (corresponding to the above second mode), which are described below.

Figure 2A:
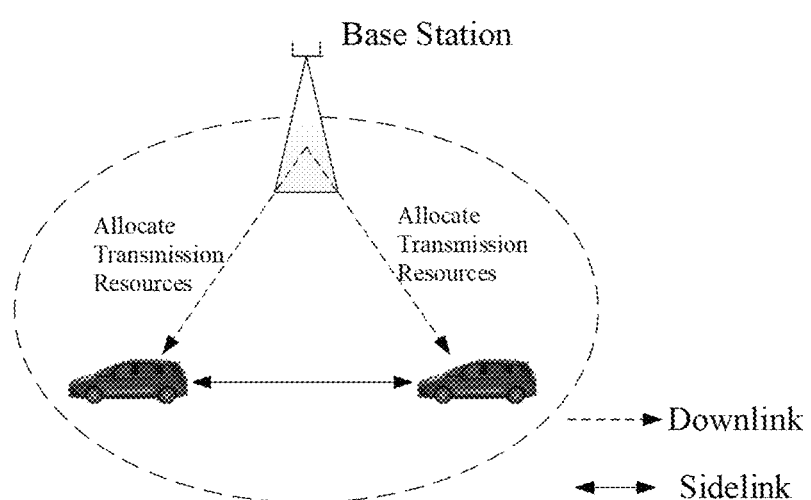
FIG. 2A is a schematic diagram showing a first mode according to an embodiment of the present disclosure.

Mode 1: As shown in FIG. 2A, transmission resources for a terminal device are allocated by a base station, and the terminal device transmits data on a sidelink according to the resources allocated by the base station. The base station may allocate resources for a single transmission, or semi-static transmission resources, for the terminal device.

Figure 2B:
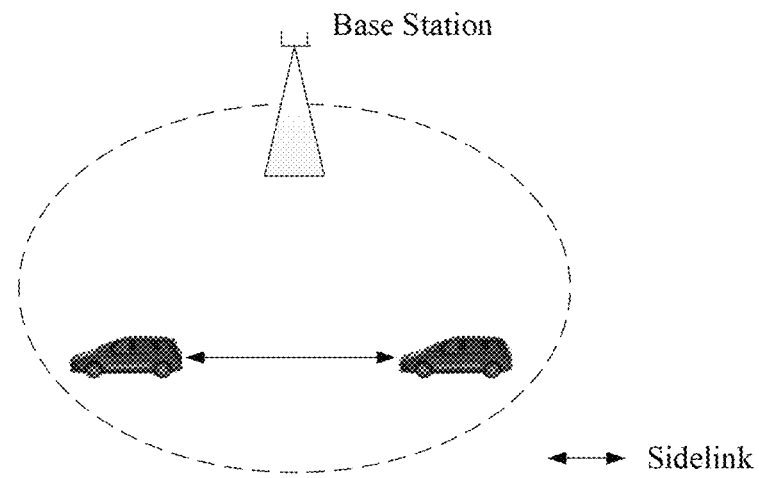
FIG. 2B is a schematic diagram showing a second mode according to an embodiment of the present disclosure.

Mode 2: As shown in FIG. 2B, the terminal device selects a resource from a resource pool for data transmission.

In the 3GPP, the study for D2D is divided into the following different stages:

Proximity based service (ProSe): In Release 12/13 (Rel-12/13), D2D communication has been studied for ProSe scenarios, mainly for public safety services.

Vehicle to Everything (V2X): In Release 14/15 (Rel-14/15), D2D communication has been studied for V2X scenarios, mainly for communications services between relatively high-speed moving vehicles and between vehicles and human users.

Wearable device (FeD2D): In Release 15 (Rel-15), D2D communication has been studied for scenarios where wearable devices access a network via mobile phones, mainly for scenarios with low moving speed and access at low power.

Configured Grant

In the 3GPP Release 15 (Rel-15), in order to reduce the transmission delay of uplink data, a configured grant (also known as grant-free) based transmission scheme is introduced, which mainly includes two configured grant methods: the first type of configured grant (type-1 configured grant) and the second type of configuration grant (type-2 configured grant).

Type 1 Configured Grant: The network configures transmission resources and transmission parameters for a terminal device via Radio Resource Control (RRC) signaling. The configuration information carried by the RRC signaling includes all transmission resources and transmission parameters such as a time domain resource, a frequency domain resource, a Demodulation Reference Signal (DMRS), power control, a Modulation and Coding Scheme (MCS), a waveform, a Redundancy Version (RV), a number of repetitions, frequency hopping, a number of Hybrid Automatic Repeat reQuest (HARD) processes. After receiving the RRC signaling, the terminal device can immediately use the configured transmission parameters to transmit a Physical Uplink Shared Channel (PUSCH) on the configured time-frequency resource.

Type 2 Configured Grant: A two-step configuration scheme is adopted. First, a high-level parameter ConfiguredGrantConfig is used to configure transmission resources and transmission parameters including a period of time-frequency resources, open-loop power control, a waveform, a redundancy version, a number of retransmissions, frequency hopping, a number of HARQ processes, etc. Then, Downlink Control Information (DCI) is used to activate a Type 2 configured grant based PUSCH transmission, and configure other transmission resources and transmission parameters including a time domain resource, a frequency domain resource, a DMRS, an MCS, etc. When the terminal device receives the high-level parameter ConfiguredGrantConfig, it cannot immediately use the resources and parameters configured by the high-level parameter to transmit a PUSCH, but has to wait until the corresponding activating DCI is received and other resources and transmission parameters are configured before a PUSCH can be transmitted. In addition, the network device can deactivate the PUSCH transmission based on the Type 2 configured grant via DCI. After the terminal device receives the deactivating DCI, it can no longer use the transmission resources based on the Type 2 configured grant for transmission.

If the network device allocates the configured grant based transmission resource for the terminal device, when the terminal device has uplink data to be transmitted, the transmission resource can be used directly for transmission without having to transmit a resource request message (such as a Scheduling Request (SR) message or a Buffer Status Report (BSR) message) to the network to request the transmission resource, thereby reducing delay.

NR-V2X

In NR-V2X, autonomous driving needs to be supported, and higher requirements, such as higher throughput, lower delay, higher reliability, larger coverage, more flexible resource allocation, etc., are imposed on data interaction between vehicles, In the NR-V2X system, a variety of transmission modes are introduced, including Mode 3 and Mode 4. Here, in Mode 3, a network device allocates transmission resources for a terminal device (corresponding to the above first mode), and in Mode 4, a terminal device selects transmission resources (corresponding to the above second mode).

In Mode 3 in NR-V2X, configured grant based resource allocation is also introduced in sidelink transmission. That is, the network device allocates sidelink transmission resources to the terminal device by means of configured grant. When the configured grant based transmission resource is allocated to the terminal device, the terminal device can transmit sidelink data over the transmission resource without having to transmit an SR/B SR message to the network to request for resources again, thereby reducing the transmission delay. In the transmission mode with configured grant, the network device allocates semi-static transmission resources to the terminal device. For Type 1 configured grant, the network device configures configured grant based transmission resources via RRC signaling, and the terminal device can transmit sidelink data over the configured grant based transmission resources. In addition, the network device can reconfigure the configured grant based transmission resources via RRC signaling. For Type 2 configured grant, the network device configures some transmission parameters via RRC signaling, configures transmission resources and other transmission parameters via DCI, and can activate or deactivate the configured grant via DCI. When the configured grant is activated, the terminal device can use the configured grant based transmission resources for transmission of sidelink data. When the configured grant is deactivated, the terminal device can no longer use the configured grant based transmission resources for transmission.

In addition, in Mode 3 in NR-V2X, dynamic allocation of transmission resources is also introduced. When a terminal device has sidelink data to transmit, it transmits a resource request to the network, the network device allocates sidelink transmission resources to the terminal device via DCI, and the terminal device uses the transmission resources to transmit sidelink data. In Mode 4 in NR-V2X, the terminal device autonomously selects transmission resources from a resource pool that is allocated by the network device or pre-configured. The terminal device can obtain a set of available resources from the resource pool by means of sensing. When a transmission resource is selected by the terminal device from the set of available resources for data transmission, for services that are periodically transmitted, the terminal device can reserve a transmission resource for the next transmission to prevent other users from occupying the resource. For services that are aperiodically transmitted, the terminal device does not reserve any transmission resource.

In NR-V2X, when Mode 3 and Mode 4 can share a resource pool, if the network device allocates transmission resources, e.g., configured grant based transmission resources, to Terminal Device 1 in Mode 3, Terminal Device 1 can use the transmission resources to transmit sidelink data. If Terminal Device 1 uses the transmission resources to transmit periodic sidelink data, it will reserve subsequent transmission resources. If Terminal Device 1 uses the transmission resources to transmit aperiodic sidelink data, it will not reserve subsequent transmission resources. At this time, another terminal device, e.g., a terminal device in Mode 4, may determine that the configured grant based transmission resources are available transmission resources when they obtain a set of available resources by means of sensing, and select the transmission resources for sidelink data transmission. However, the network device does not know that the transmission resources have been occupied by the terminal device in Mode 4, and Terminal Device 1 will not listen to determine whether the resources are used by other terminal devices, resulting in resource collisions. In view of above, the following technical solutions according to the embodiments of the present disclosure are proposed.

Figure 3:
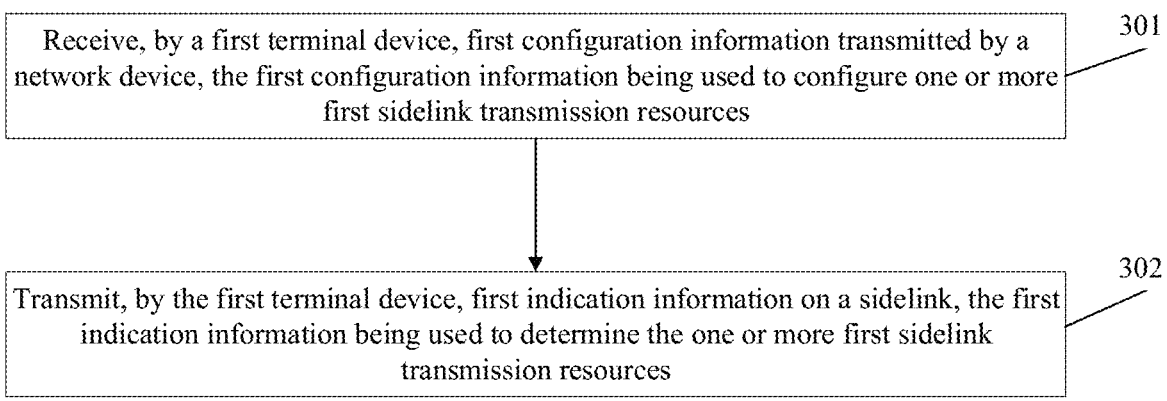
FIG. 3 is a first flowchart illustrating a resource sharing method according to an embodiment of the present disclosure.

FIG. 3 is a first schematic flowchart illustrating a resource sharing method according to an embodiment of the present disclosure. As shown in FIG. 3, the resource sharing method includes the following steps.

At step 301, a first terminal device receives first configuration information transmitted by a network device. The first configuration information is used to configure one or more first sidelink transmission resources.

In an embodiment of the present disclosure, the first terminal device may be any device capable of communicating with a network, such as a mobile phone, a tablet computer, a vehicle-mounted terminal, a wearable device, a notebook, or the like.

In an embodiment of the present disclosure, the network device may be a base station, such as a gNB, an eNB, or the like.

In an embodiment of the present disclosure, the network device allocates the one or more first sidelink transmission resources to the first terminal device, and transmits the first configuration information for configuring the one or more first sidelink transmission resources to the first terminal device. Here, since the transmission resources of the first terminal device are allocated by the network device, the transmission mode of the first terminal device is the first mode (which may be Mode 1 or Mode 3), and the resource allocation scheme in the first mode is that the network device allocates the transmission resources for the terminal device.

In an optional implementation, the one or more first sidelink transmission resources can be configured by means of configured grant based resource allocation. That is, the network device can allocate the one or more first sidelink transmission resources to the terminal device using a configured grant (e.g., a Type 1 configured grant or a Type 2 configured grant).

In an optional implementation, the one or more first sidelink transmission resources may be configured by means of dynamically scheduled resource allocation. That is, the network device can allocate the one or more first sidelink transmission resources to the terminal device via DCI. In an optional implementation, the network device can allocate the one or more first sidelink transmission resources to the first terminal device.

At step 302, the first terminal device transmits first indication information on a sidelink. The first indication information is used to determine the one or more first sidelink transmission resources.

In an embodiment of the present disclosure, after receiving the first indication information, another terminal device (such as a second terminal device) may determine, based on the first indication information, the one or more first sidelink transmission resources of the first terminal device as allocated by the network device, thereby avoiding using the one or more first sidelink transmission resources.

In an embodiment of the present disclosure, the first indication information can be used to indicate time domain information and/or frequency domain information of the one or more first sidelink transmission resources.

In an optional implementation, the first terminal device can transmit the first indication information by means of broadcast on the sidelink.

Figure 4:
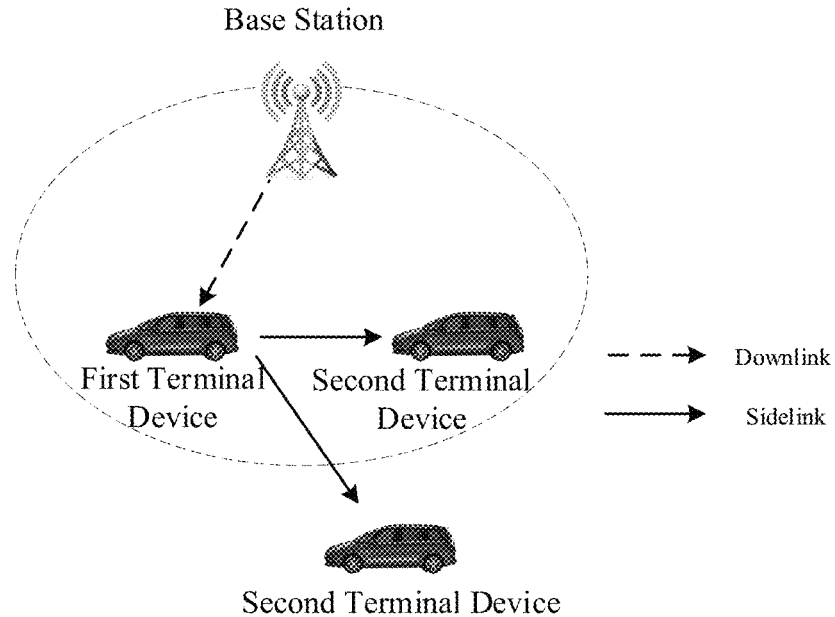
FIG. 4 is a schematic diagram showing transmission of first indication information according to an embodiment of the present disclosure.

For example, referring to FIG. 4, a base station allocates one or more first sidelink transmission resources (e.g., configured grant based transmission resources) for a first terminal device, and transmits first configuration information, which is used to configure the one or more first sidelink transmission resources, to the first terminal device in a downlink. After obtaining the first configuration information, the first terminal device transmits the first indication information used for determining the one or more first sidelink transmission resources on a sidelink. Optionally, the first terminal device may transmit the first indication information to other users (e.g., a second terminal device) by means of broadcast.

In an embodiment of the present disclosure, the first indication information may be carried in Sidelink Control Information (SCI) or a Physical Sidelink Shared Channel (PSSCH).

In an optional implementation, the first indication information may be carried in the SCI. Further, the SCI may also carry at least one of:

second indication information used to determine a time interval between two adjacent first sidelink transmission resources or a period of the one or more first sidelink transmission resources;

third indication information used to determine information on a Band Width Part (BWP) where the one or more first sidelink transmission resources are located and/or information on a resource pool where the one or more first sidelink transmission resources are located; and fourth indication information indicating that the one or more first sidelink transmission resources are allocated by the network device or that the first terminal device is operating in a first mode (the first terminal device uses one or more sidelink transmission resources allocated by the network device when operating in the first mode).

For example, the SCI may include an information field for carrying the fourth indication information. The information field may be, for example, 1 bit. When the value of the bit is a first value (for example, the first value may be 1), it means that the one or more first sidelink transmission resources indicated by the SCI or the one or more first sidelink transmission resources indicated in the PSSCH corresponding to the SCI are one or more transmission resources allocated by the network device (i.e., one or more transmission resources in the first mode).

For example, the SCI may include an information field for carrying the fourth indication information. The information field may be, for example, 1 bit. When the value of the bit is a first value (for example, the first value may be 1), it means that the first terminal device is operating in the first mode. When the first terminal device is operating in the first mode, the sidelink transmission resources used by the first terminal device are sidelink transmission resources allocated by the network device. When the value of the bit is a second value (for example, the second value may be 0), it means that the first terminal device is operating in the second mode. When the first terminal device is operating in the second mode, the sidelink transmission resources used by the first terminal device are transmission resources selected autonomously by the first terminal device.

In an optional implementation, the first indication information is carried in the PSSCH. Further, the PSSCH may also carry at least one of:

second indication information used to determine a time interval between two adjacent first sidelink transmission resources or a period of the one or more first sidelink transmission resources;

third indication information used to determine information on a Band Width Part (BWP) where the one or more first sidelink transmission resources are located and/or information on a resource pool where the one or more first sidelink transmission resources are located; and fourth indication information indicating that the one or more first sidelink transmission resources are allocated by the network device or that the first terminal device is operating in a first mode (the first terminal device uses one or more sidelink transmission resources allocated by the network device when operating in the first mode).

Optionally, the PSSCH may carry the above one or more types of indication information in a Media Access Control (MAC) Control Element (CE).

It is to be noted that the above first indication information, second indication information, third indication information, and fourth indication information may be carried in the SCI or the PSSCH corresponding to the SCI, or some of them may be carried in the SCI, and the others may be carried in the PSSCH. For example, the fourth indication information may be carried in the SCI, and the other indication information may be carried in the PSSCH. As another example, the first indication information and the fourth indication information may be carried in the SCI, and the second indication information and the third indication information may be carried in the PSSCH.

In the embodiment of the present disclosure, the SCI may be used to schedule the PSSCH. In particular, the SCI may be used to indicate a transmission parameter and a transmission resource of the PSSCH.

In an embodiment of the present disclosure, the first terminal device may obtain a second sidelink transmission resource, and transmit the first indication information on the second sidelink transmission resource.

Here, the first terminal device may obtain the second sidelink transmission resource according to any of the following schemes.

Scheme 1: the first terminal device receives second configuration information transmitted by the network device. The second configuration information is used to indicate the second sidelink transmission resource.

Here, the second sidelink transmission resource may be a transmission resource in the first mode (which may be Mode 1 or Mode 3).

In an optional embodiment, the first configuration information and the second configuration information may be the same configuration information.

For example, the network may configure one or more configured grant based sidelink transmission resources, i.e., the one or more first sidelink transmission resources, for the terminal device using the first configuration information. The one or more first sidelink transmission resources may include a plurality of transmission resources, from which the terminal device selects one transmission resource (i.e., the second sidelink transmission resource) for transmitting the first indication information. The first indication information is used to indicate the one or more first sidelink transmission resources configured by the network.

In an optional embodiment, the first configuration information and the second configuration information may be different configuration information.

For example, the network may configure one or more configured grant based sidelink transmission resources, i.e., the one or more first sidelink transmission resources, for the terminal device using the first configuration information, and allocate the second sidelink transmission resource to the terminal device using DCI (i.e., the second configuration information). The terminal device transmits the first indication information on the second sidelink transmission resource. The first indication information is used to indicate the one or more first sidelink transmission resources configured by the network.

Scheme 2: The first terminal device obtains resource pool configuration information, and determines a first resource pool based on the resource pool configuration information. The first terminal device determines the second sidelink transmission resource from the first resource pool by means of sensing or random selection.

Here, the resource pool configuration information may be configured by the network device or pre-configured.

Here, the second sidelink transmission resource may be a transmission resource in the second mode (which may be Mode 2 or Mode 4).

In the technical solution according to the embodiments of the present disclosure, the first terminal device in the first mode transmits the one or more first sidelink transmission resources allocated by the network device on the sidelink, such that another terminal device (such as a terminal device in the second mode) can obtain the first sidelink transmission resource(s) of the terminal device in the first mode and thus avoid using the first sidelink transmission resource(s). Therefore, the interference between the terminal device in the second mode and the terminal device in the first mode can be avoided.

Figure 5:
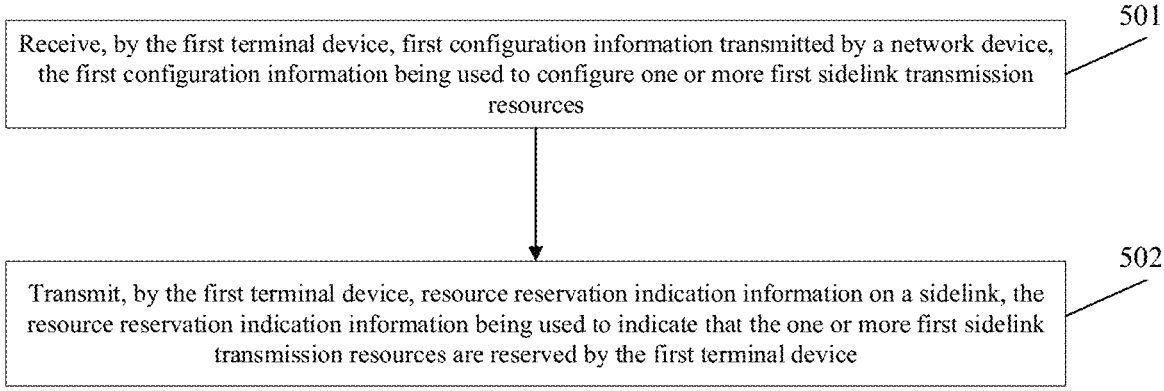
FIG. 5 is a second flowchart illustrating a resource sharing method according to an embodiment of the present disclosure.

FIG. 5 is a second schematic flowchart illustrating a resource sharing method according to an embodiment of the present disclosure. As shown in FIG. 5, the resource sharing method includes the following steps.

At step 501, a first terminal device receives first configuration information transmitted by a network device. The first configuration information is used to configure one or more first sidelink transmission resources.

In an embodiment of the present disclosure, the first terminal device may be any device capable of communicating with a network, such as a mobile phone, a tablet computer, a vehicle-mounted terminal, a wearable device, a notebook, or the like.

In an embodiment of the present disclosure, the network device may be a base station, such as a gNB, an eNB, or the like.

In an embodiment of the present disclosure, the network device allocates the one or more first sidelink transmission resources to the first terminal device, and transmits the first configuration information for configuring the one or more first sidelink transmission resources to the first terminal device. Here, since the transmission resources of the first terminal device are allocated by the network device, the transmission mode of the first terminal device is the first mode (which may be Mode 1 or Mode 3), and the resource allocation scheme in the first mode is that the network device allocates the transmission resources for the terminal device.

In an optional implementation, the one or more first sidelink transmission resources can be configured by means of configured grant based resource allocation. That is, the network device can allocate the one or more first sidelink transmission resources to the terminal device using a configured grant (e.g., a Type 1 configured grant or a Type 2 configured grant).

In an optional implementation, the one or more first sidelink transmission resources may be configured by means of dynamically scheduled resource allocation. That is, the network device can allocate the one or more first sidelink transmission resources to the terminal device via DCI.

In an optional implementation, the network device can allocate the one or more first sidelink transmission resources to the first terminal device.

At step 502, the first terminal device transmits resource reservation indication information on a sidelink. The resource reservation indication information is used to indicate that the one or more first sidelink transmission resources are reserved by the first terminal device.

In an existing mechanism, for example, in an LTE-V2X system, if the terminal device transmits a periodic service, it will indicate that a resource is reserved for the next transmission. If the terminal device transmits an aperiodic service, it will not reserve any resource for the next transmission. In an embodiment of the present disclosure, when the first terminal device transmits sidelink data on a sidelink, the sidelink data corresponds to a periodic service or an aperiodic service. The resource reservation indication information is transmitted on the sidelink, and is used to indicate that a resource is reserved for the next transmission.

Further, in the LTE-V2X system, the terminal device determines the resource to be reserved for the next transmission based on the sidelink data to be transmitted. For example, if the data to be transmitted is a 100 ms periodic service, a transmission resource 100 ms later may be reserved by the terminal device. If the data to be transmitted is a 500 ms periodic service, a transmission resource 500 ms later will be reserved by the terminal device. In an embodiment of the present disclosure, the first terminal device can determine the transmission resource to be reserved next based on the configuration information of the one or more first sidelink transmission resources as transmitted by the network, rather than the sidelink data to be transmitted by the terminal. For example, when the period of the first sidelink transmission resources configured by the network is 50 ms, i.e., there is one first sidelink transmission resource every 50 ms, and the sidelink data to be transmitted by the first terminal device is a 100 ms periodic service, the resource reservation indication information of the first terminal device may indicate that the transmission resource 50 ms later is reserved. As another example, when the period of the first sidelink transmission resources configured by the network is 50 ms, i.e., there is one first sidelink transmission resource every 50 ms, and the sidelink data to be transmitted by the first terminal device is an aperiodic service, the resource reservation indication information of the first terminal device may indicate that the transmission resource 50 ms later is reserved.

It is to be noted that the next transmission here refers to transmission of the next new Transmission Block (TB), rather than retransmission of a data block.

In an embodiment of the present disclosure, the resource reservation indication information may be carried in SCI. Further, the SCI may further carry at least one of:

fifth indication information used to indicate that the one or more first sidelink transmission resources are allocated by the network device or that the first terminal device is operating in a first mode (the first terminal device uses one or more sidelink transmission resources allocated by the network device when operating in the first mode);

sixth indication information used to determine a time interval between the one or more reserved first sidelink transmission resources and a transmission resource for transmitting the resource reservation indication information; and seventh indication information used to determine a number of times the one or more first sidelink transmission resources are reserved (or a number of reserved first sidelink transmission resources).

In an optional implementation, the SCI may be used to indicate a transmission parameter and a transmission resource of a PSSCH, and the PSSCH is used to transmit sidelink data of an aperiodic service. That is, the sidelink data transmitted in the PSSCH scheduled by the SCI corresponds to the aperiodic service.

In an optional implementation, the SCI may be used to indicate a transmission parameter and a transmission resource of a PSSCH, and the PSSCH is used to transmit sidelink data of a periodic service. That is, the sidelink data transmitted in the PSSCH scheduled by the SCI corresponds to the periodic service.

In an example, the network device allocates the first sidelink transmission resources to the first terminal device, which may be configured grant based transmission resources. The first sidelink transmission resources are a set of periodic transmission resources. When the first terminal device uses the first sidelink transmission resources to transmit sidelink data of a periodic or aperiodic service, the resource reservation indication information can be carried in the SCI to indicate that subsequent transmission resources are reserved, so as to prevent another user, such as a user in the second mode (which may be Mode 2 or Mode 4) from occupying the transmission resources.

In an example, the SCI may include an information field for carrying the resource reservation indication information. The information field may be, for example, 1 bit. When the value of the bit is a first value (for example, the first value may be 1), it means that the one or more first sidelink transmission resources are reserved by the first terminal device. When the value of the bit is a second value (for example, the second value may be 0), it means that the one or more first sidelink transmission resources are not reserved by the first terminal device.

In an example, the SCI may include an information field for carrying the fifth indication information. The information field may be, for example, 1 bit. When the value of the bit is a first value (for example, the first value may be 1), it means that the one or more first sidelink transmission resources indicated in the SCI, or the one or more first sidelink transmission resources indicated in the PSSCH corresponding to the SCI are one or more transmission resources allocated by the network device (i.e., one or more transmission resources in the first mode). Alternatively, when the value of the bit is the first value (for example, the first value may be 1), it means that the first terminal device is operating in the first mode, and when the first terminal device is operating in the first mode, the one or more sidelink transmission resources used by the first terminal device are one or more sidelink transmission resources allocated by the network device. When the value of the bit is a second value (for example, the second value may be 0), it means that the first terminal device is operating in the second mode, and when the first terminal device is operating in the second mode, the one or more sidelink transmission resources used by the first terminal device are one or more transmission resources selected autonomously by the first terminal device.

In an example, the SCI may include an information field for carrying the sixth indication information, and the indication field is used to determine the time interval between the one or more reserved first sidelink transmission resources and the transmission resource for transmitting the resource reservation indication information. For example, the time interval that can be determined from the value of the information field may be {10, 20, 50, 100, 200, 500, 1000} ms, etc.

In an example, the SCI may include an information field for carrying the seventh indication information, and the indication field is used to indicate how many times the one or more first sidelink transmission resources are reserved (or how many first sidelink transmission resources are reserved) or how many periods in which the first sidelink transmission resources are reserved by the first terminal device. For example, the value range of the number of times of reservations as indicated in the information field may be [0,7], where a value of 0 means that no first sidelink transmission resource is reserved, and a value of 1 means that one first sidelink transmission resource is reserved, a value of 2 means that two first sidelink transmission resources are reserved, and so on.

For example, the SCI may include an information field for carrying the sixth indication information, and the indication field indicates a time interval of 100 ms. In addition, the SCI may include an information field for carrying the seventh indication information. The value of the indication field may be 5, which means that the first sidelink transmission resources of 5 transmission periods are reserved. If the terminal device transmits the SCI in time slot n, it means that the terminal device reserves transmission resources in time slots n+100, n+200, n+300, n+400, and n+500.

Figure 6:
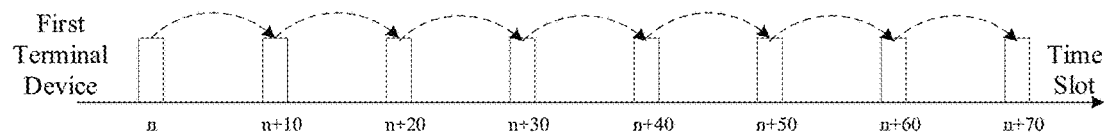
FIG. 6 is a first schematic diagram showing transmission resources according to an embodiment of the present disclosure.

It is to be noted that if the first terminal device indicates in the SCI that the one or more first sidelink transmission resources are reserved, when the first terminal device has no data to transmit on a certain first sidelink transmission resource, it cannot reserve a first sidelink transmission resource in the next period. In this case, another user may occupy the first sidelink transmission resource, resulting in a resource collision. As shown in FIG. 6, when the first terminal device transmits data on each transmission resource, it reserves a resource for the next transmission. However, for an aperiodic transmission service, the first terminal device does not have sidelink data to transmit on all transmission resources. For example, there is no sidelink data transmission in time slot n+20, and thus the transmission resource in n+30 cannot be reserved. In this case, another terminal device may occupy the transmission resource in n+30.

Figure 7:
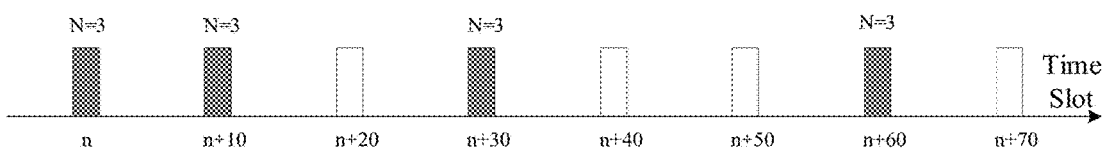
FIG. 7 is a second schematic diagram showing transmission resources according to an embodiment of the present disclosure.

In an embodiment of the present disclosure, by indicating the number of times of reservations, even if the first terminal device does not transmit data on a certain first sidelink transmission resource, the first sidelink transmission resource can be reserved by the number of times of reservations as indicated in the previous SCI. As shown in FIG. 7, the network device may configure transmission resources for the first terminal device, which may be configured grant based transmission resources, at a period of 10 time slots. That is, there is one transmission resource in every 10 time slots. When the first terminal device has data to transmit in time slot n, the seventh indication information N (for example, N=3) used for determining the number of times of reservations may be carried in the SCI. The seventh indication information may be carried in each data transmission. For example, there are data transmissions in time slots n, n+10, and n+30, and the seventh indication information may be carried in each SCI. The SCI transmitted in time slot n+30 can reserve transmission resources in the next three periods, i.e., transmission resources in n+40, n+50, and n+60. However, if there is no data transmission in n+60, subsequent transmission resources, such as a transmission resource in time slot n+70, cannot be reserved. In this case, another user may occupy the transmission resource. Thus, sidelink data such as random bits or redundant bits may also be transmitted in time slot n+60, such that the transmission resources in the next three periods (i.e., n+70, n+80, and n+90) can be reserved.

In an optional implementation, the first terminal device may receive third configuration information or first control information transmitted by the network device. The third configuration information is used to configure a third sidelink transmission resource, and the first control information is used to indicate release of the one or more first sidelink transmission resources. The first terminal device may transmit ninth indication information used to indicate that no resource is reserved by the first terminal device.

Figure 8:
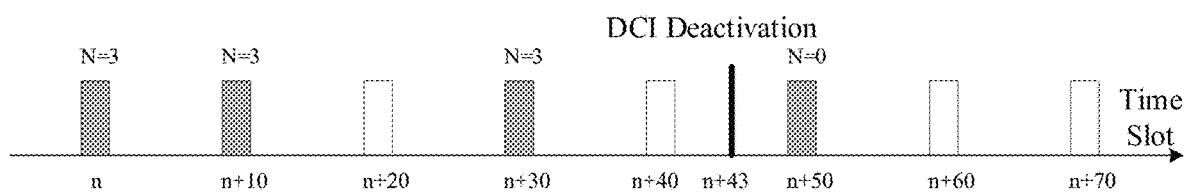
FIG. 8 is a third schematic diagram showing transmission resources according to an embodiment of the present disclosure.

Here, when the first terminal device receives the resource reconfiguration information (i.e., the third configuration information) transmitted by the network device, or the deactivation information (i.e., the first control information) transmitted by the network device, the SCI transmitted by the first terminal device carries the indication information indicating that no first sidelink transmission resource is reserved, such that the one or more first sidelink transmission resources can be released. As shown in FIG. 8, the resource reservation indication information transmitted by the terminal device in time slot n+30 indicates that the transmission resources in the next three periods, (i.e., n+40, n+50, and n+60) are reserved. During the process of transmission, if the first terminal device receives the resource reconfiguration information or deactivation information transmitted by the network device, e.g., if DCI for deactivating the configured grant is received in time slot n+43, then the first terminal device can transmit sidelink data in time slot n+50, without reserving transmission resources, thereby releasing the transmission resources in the subsequent periods.

In an optional implementation, the number of times the one or more first sidelink transmission resources are reserved may be pre-configured or configured by the network device.

For example, the number N of times the one or more first sidelink transmission resources are reserved may be a fixed value, which can be pre-configured or configured by the network device. In this case, the SCI transmitted by first terminal device may carry the resource reservation indication information. For example, the resource reservation indication information may be 1 bit, and the value of this bit is used to indicate whether subsequent transmission resources are reserved by the first terminal device, and if so, N transmission resources are reserved. As shown in FIG. 8, if the network device configures the number of times of reservations as N=3, a 1-bit indication field can be included in the SCI to indicate whether subsequent transmission resources are reserved. When the first terminal device transmits sidelink data, if it needs to reserve the subsequent transmission resources, it can set this bit to 1 in the SCI, indicating that the subsequent transmission resources are reserved for 3 times, such as in time slots n, n+10, and n+30. If the first terminal device does not need to reserve subsequent transmission resources, such as in time slot n+50, then this bit can be set to 0 in the SCI.

In an optional implementation, when the one or more first sidelink transmission resources configured in the first configuration information are one or more configured grant based transmission resources, the resource reservation indication information may further include: eighth indication information used to determine a period of the one or more first sidelink transmission resources. Alternatively, the time interval determined from the sixth indication information is equal to a period of the one or more first sidelink transmission resources.

Here, the network device may configure configured grant based transmission resources for the first terminal device. The transmission resources have periodicity. Therefore, the first terminal device can carry the information on the period of the transmission resources in the SCI. Alternatively, if the SCI carries the sixth indication information used to determine the time interval between the one or more reserved first sidelink transmission resources and the transmission resource for transmitting the resource reservation indication information, and the time interval is equal to the period of the transmission resources.

In an example, the network device may configure configured grant based transmission resources for the first terminal device, and configure the information on the period of the transmission resources, for example, 50 ms. That is, the transmission resource in every 50 ms can be used for the first terminal device to transmit sidelink data. When the first terminal device uses the transmission resource to transmit the sidelink data, regardless of whether it is for a periodic or aperiodic service, the first terminal device may carry the sixth indication information or the eighth indication information, i.e., 50 ms, in the SCI, for indicating that the same transmission resource after 50 ms is reserved by the first terminal device. Further, even if the first terminal device transmits a periodic service, but the period of the service is not 50 ms, e.g., 100 ms or 200 ms, the sixth indication information or the eighth indication information carried in the SCI by the first terminal device may also indicate 50 ms.

In an optional implementation, the first configuration information may be used to configure a plurality of first transmission resources when the first sidelink transmission resources configured in the first configuration information are dynamically allocated transmission resources. The time interval determined from the sixth indication information is determined based on the plurality of first sidelink transmission resources configured in the first configuration information. Here, the time interval between every two adjacent first sidelink transmission resources in the plurality of first sidelink transmission resources may be all the same, completely different, or partly different.

Here, the transmission resources allocated by the network device to the first terminal device may be dynamically allocated transmission resources. For example, if the network device allocates a plurality of transmission resources to the first terminal device via DCI, the DCI may indicate the plurality of transmission resources. When the terminal device uses one of the plurality of transmission resources to transmit sidelink data, regardless of whether the sidelink data is for a periodic or aperiodic service, it can carry the resource reservation indication information in the SCI to indicate that the subsequent transmission resources are reserved. Further, the SCI may also carry information indicating the time interval between the next transmission resource and the current transmission resource.

In an example, the network device may allocate 4 transmission resources to the first terminal device via DCI. The frequency domain resources of these four transmission resources are the same, and the time intervals between every two adjacent transmission resources may be the same or different. For example, the time intervals between every two adjacent transmission resources in the four transmission resources may be 10 ms, 15 ms, and 20 ms, respectively. When the first terminal device uses the first transmission resource for transmission, it can indicate 10 ms in the SCI to reserve the second transmission resource. When the second transmission resource is used for transmission, 15 ms can be indicated in the SCI to reserve the third transmission resource. When the third transmission resource is used for transmission, 20 ms can be indicated in the SCI to reserve the fourth transmission resource. When the fourth transmission resource is used for transmission, the SCI does not reserve the next transmission resource. If the time intervals between every two adjacent transmission resources in the four transmission resources are all 20 ms, when the first terminal device uses each of the first three transmission resources for transmission, it can indicate 20 ms in the SCI to reserve resources for the next transmission. When the fourth transmission resource is used for transmission, the next transmission resource is not reserved in the SCI.

In the above solution, if the first sidelink transmission resource allocated by the network device to the first terminal device is already occupied by another user, any of the following schemes can be used for resource coordination.

The first terminal device can transmit tenth indication information and/or a first resource request message to the network device in response to detecting that the one or more first sidelink transmission resources are occupied or reserved by a second terminal device. The tenth indication information is used to indicate that the one or more first sidelink transmission resources are occupied or reserved, and the first resource request message is used to request the network device to reallocate one or more sidelink transmission resources for the first terminal device.

Optionally, the first terminal device may determine a set of available resources, and report the set of available resources to the network device. The set of available resources is used to assist the network device in reallocating the sidelink transmission resources for the first terminal device. Further, the first terminal device may determine the set of available resources by means of sensing.

Figure 9:
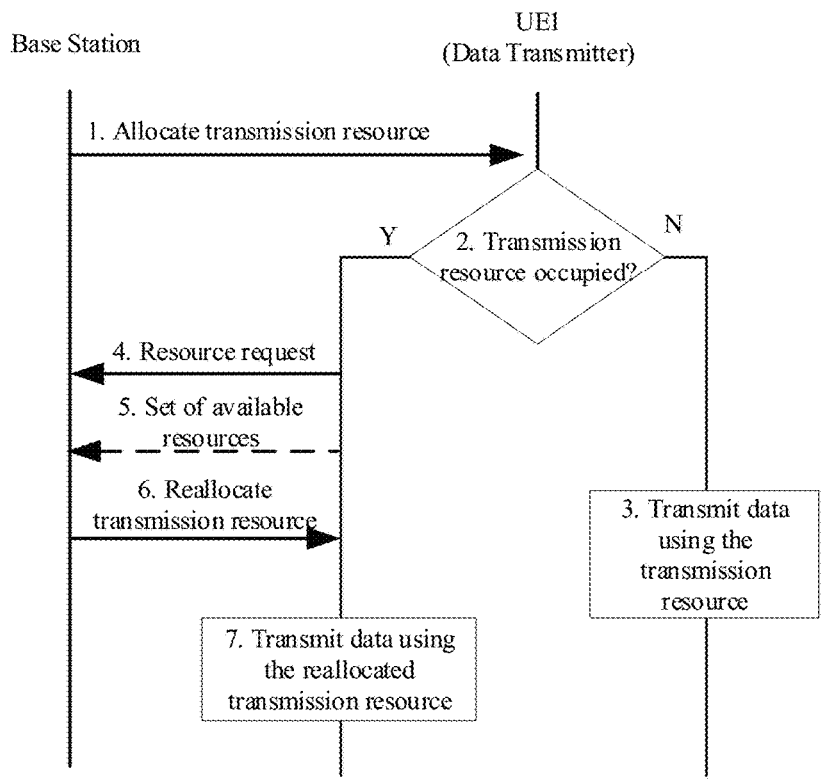
FIG. 9 is a flowchart illustrating transmission resource allocation according to an embodiment of the present disclosure.

As shown in FIG. 9: 1. A base station allocates transmission resources to UE1. 2. UE1 determines whether the transmission resources are occupied. 3. If the transmission resources are not occupied, the transmission resources are used to transmit data. 4. If the transmission resources are occupied, UE1 initiates a resource request to the base station. 5. UE1 reports the set of available resources to the base station. 6. The base station reallocates transmission resources for UE1. 7. UE1 uses the reallocated transmission resources to transmit data.

If the first terminal device detects that the one or more first sidelink transmission resources allocated by the network device for the first terminal device are occupied or reserved by another user, the first terminal device still uses the one or more first sidelink transmission resources allocated by the network for data transmission. If another terminal device (e.g., a terminal device in Mode 2 or Mode 4) detects that the first terminal device uses the one or more first sidelink transmission resources and reserves the subsequent transmission resources, it can avoid continuing using the one or more first sidelink transmission resources.

Figure 10:
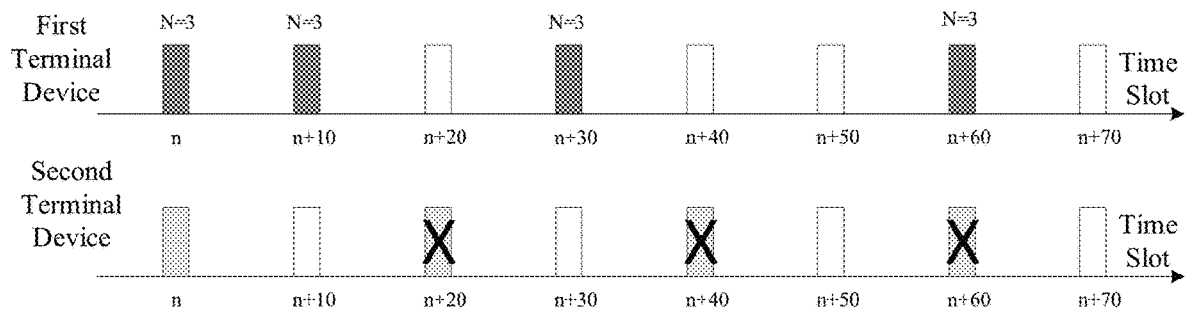
FIG. 10 is a fourth schematic diagram showing transmission resources according to an embodiment of the present disclosure.

As shown in FIG. 10, the first terminal device uses time slots n, n+10, n+30, and n+60 to transmit data. If the second terminal device uses time slot n to transmit data and the reservation period is 20 ms, then the second terminal device will reserve transmission resources in time slots n+20, n+40, n+60, and so on. Although the data of the two terminal devices collide in time slot n, the second terminal device does not transmit data in time slot n+10 or n+30 when the first terminal device transmits data, thus the second terminal device can receive data transmitted by the first terminal device, so as to avoid using the transmission resources reserved by the first terminal device. For example, when the second terminal device detects that the first terminal device transmits data in time slot n+10, and reserves the transmission resources in the next three periods, the second terminal device will not continue using the transmission resources, thereby avoiding interference with the first terminal device.

The first terminal device may obtain a fourth sidelink transmission resource in response to detecting that the one or more first sidelink transmission resources are occupied or reserved by a second terminal device, and transmit the resource reservation indication information on the fourth sidelink transmission resource. Upon receiving the resource reservation indication information transmitted by the first terminal device, the second terminal device will not continue using the one or more first sidelink transmission resources of the first terminal device.

Optionally, the first terminal device may receive fourth configuration information transmitted by the network device. The fourth configuration information is used to indicate the fourth sidelink transmission resource. Further, the first terminal device may transmit a second resource request message to the network device, and receive fourth configuration information transmitted by the network device. The fourth configuration information is used to indicate the fourth sidelink transmission resource. Here, the fourth sidelink transmission resource is a transmission resource different from the first sidelink transmission resource.

Optionally, the first terminal device may obtain resource pool configuration information, and determine a second resource pool based on the resource pool configuration information. The first terminal device may determine the fourth sidelink transmission resource from the second resource pool by means of sensing or random selection.

Figure 11:
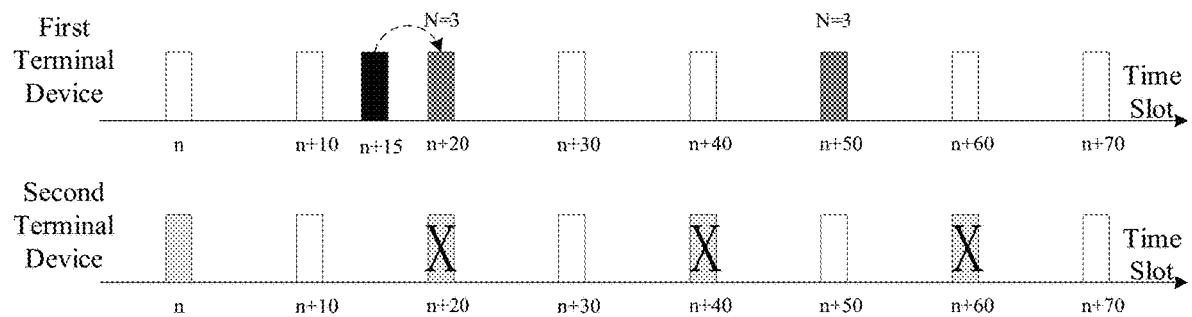
FIG. 11 is a fifth schematic diagram showing transmission resources according to an embodiment of the present disclosure.

In an example, as shown in FIG. 11, the network device allocates configured grant based transmission resources for the first terminal device at a period of 10 ms. The second terminal device uses the same transmission resource to transmit sidelink data in time slot n, and the transmission resource 20 ms later is reserved by the second terminal device. Therefore, the transmission resources expected to be used by the second terminal device are the transmission resources in time slots n+20, n+40, and n+60. When the first terminal device detects, by means of sensing, that the second terminal device uses the transmission resource in time slot n, the first terminal device determines the second resource pool based on the resource pool information configured by the network, and obtains the fourth sidelink transmission resource from this resource pool by means of sensing. For example, a transmission resource in time slot n+15 can be obtained, and the SCI can be transmitted on the transmission resource. The resource reservation indication information is carried in the SCI to indicate the transmission resource in time slot n+20 is reserved. The second terminal device can detect the SCI transmitted by the first terminal device, so as to avoid using time slot n+20 to transmit sidelink data. Further, the first terminal device transmits data on the transmission resources in time slots n+20 and n+50, and reserves transmission resources in the next 3 periods. The second terminal device detects that the first terminal device reserves the transmission resources, and accordingly avoids using the transmission resources in n+40 and n+60.

In the technical solutions of the embodiments of the present disclosure, the first terminal device in the first mode transmits sidelink data on the sidelink. Regardless of whether the sidelink data is for a periodic or aperiodic service, the first terminal device indicates that the subsequent transmission resources are reserved. When another terminal device (e.g., a terminal device in the second mode) detects the sidelink data from the first terminal device in the first mode, it can learn the transmission resources reserved by the first terminal device in the first mode, so as to avoid using the transmission resources reserved by the first terminal device. Further, when another terminal device (e.g., as a terminal device in the second mode) uses or reserves the transmission resource of the first terminal device, the first terminal device may transmit instruction information to the network device, indicating reallocation of transmission resources, or transmit the resource reservation indication information on a transmission resource obtained by means of sensing, so as to avoid interference between the terminal device in the second mode and the terminal device in the first mode.

Figure 12:
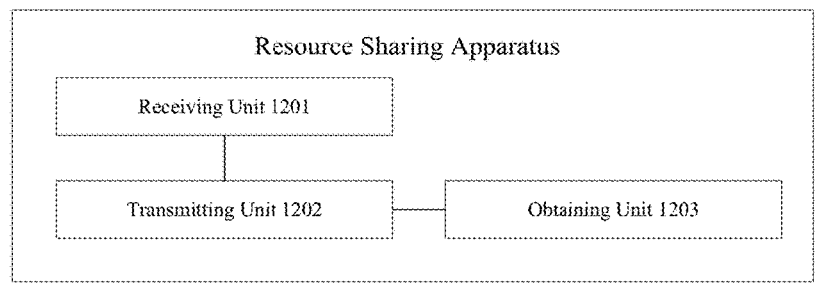
FIG. 12 is a first schematic diagram showing a structure of a resource sharing apparatus according to an embodiment of the present disclosure.

FIG. 12 is a first schematic diagram showing a structure of a resource sharing apparatus according to an embodiment of the present disclosure. As shown in FIG. 12, the resource sharing apparatus includes:
  a receiving unit 1201 configured to receive first configuration information transmitted by a network device, the first configuration information being used to configure one or more first sidelink transmission resources; and
  a transmitting unit 1202 configured to transmit first indication information on a sidelink, the first indication information being used to determine the one or more first sidelink transmission resources.

In an embodiment, the first indication information may be carried in SCI or a PSSCH.

In an embodiment, the SCI may further carry at least one of:
  second indication information used to determine a time interval between two adjacent first sidelink transmission resources or a period of the one or more first sidelink transmission resources;
  third indication information used to determine information on a Band Width Part (BWP) where the one or more first sidelink transmission resources are located and/or information on a resource pool where the one or more first sidelink transmission resources are located; and
  fourth indication information indicating that the one or more first sidelink transmission resources are allocated by the network device or that the first terminal device is operating in a first mode, wherein the first terminal device uses one or more sidelink transmission resources allocated by the network device when operating in the first mode.

In an embodiment, the PSSCH may further carry at least one of:
  second indication information used to determine a time interval between two adjacent first sidelink transmission resources or a period of the one or more first sidelink transmission resources;
  third indication information used to determine information on a Band Width Part (BWP) where the one or more first sidelink transmission resources are located and/or information on a resource pool where the one or more first sidelink transmission resources are located; and
  fourth indication information indicating that the one or more first sidelink transmission resources are allocated by the network device or that the first terminal device is operating in a first mode, wherein the first terminal device uses one or more sidelink transmission resources allocated by the network device when operating in the first mode.

In an embodiment, the SCI may be used to indicate a transmission parameter and a transmission resource of the PSSCH.

In an embodiment, the first indication information may be used to indicate time domain information and/or frequency domain information of the one or more first sidelink transmission resources.

In an embodiment, the apparatus may further include: an obtaining unit 1203 configured to obtain a second sidelink transmission resource. The transmitting unit 1202 may be configured to transmit the first indication information on the second sidelink transmission resource.

In an embodiment, the obtaining unit 1203 may be configured to receive second configuration information transmitted by the network device, the second configuration information being used to indicate the second sidelink transmission resource.

In an embodiment, the obtaining unit 1203 may be configured to obtain resource pool configuration information, and determine a first resource pool based on the resource pool configuration information; and determine the second sidelink transmission resource from the first resource pool by means of sensing or random selection.

It can be appreciated by those skilled in the art that, for relevant description of the above resource sharing apparatus according to the embodiment of the present disclosure, reference can be made to the relevant description of the resource sharing method according to the embodiment of the present disclosure.

Figure 13:
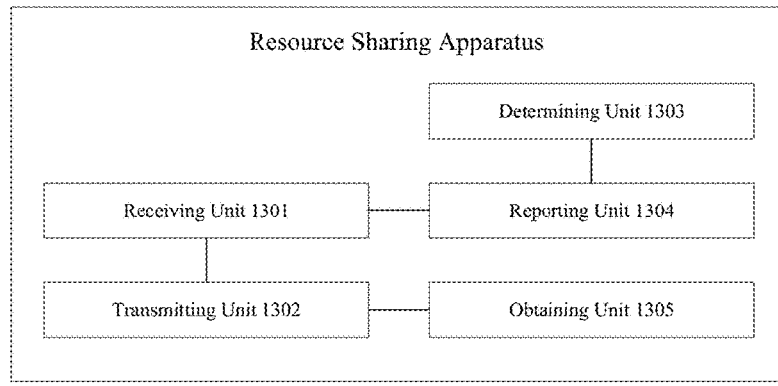
FIG. 13 is a second schematic diagram showing a structure of a resource sharing apparatus according to an embodiment of the present disclosure.

FIG. 13 is a second schematic diagram showing a structure of a resource sharing apparatus according to an embodiment of the present disclosure. As shown in FIG. 13, the resource sharing apparatus includes:
  a receiving unit 1301 configured to receive first configuration information transmitted by a network device, the first configuration information being used to configure one or more first sidelink transmission resources; and
  a transmitting unit 1302 configured to transmit resource reservation indication information on a sidelink, the resource reservation indication information being used to indicate that the one or more first sidelink transmission resources are reserved by the first terminal device.

In an embodiment, the resource reservation indication information may be carried in SCI.

In an embodiment, the SCI may further indicate at least one of:
  fifth indication information used to indicate that the one or more first sidelink transmission resources are allocated by the network device or that the first terminal device is operating in a first mode; wherein the first terminal device uses one or more sidelink transmission resources allocated by the network device when operating in the first mode;

sixth indication information used to determine a time interval between the one or more reserved first sidelink transmission resources and a transmission resource for transmitting the resource reservation indication information; and seventh indication information used to determine a number of times the one or more first sidelink transmission resources are reserved.

In an embodiment, the number of times the one or more first sidelink transmission resources are reserved may be pre-configured or configured by the network device.

In an embodiment, when the one or more first sidelink transmission resources configured in the first configuration information are one or more configured grant based transmission resources, the resource reservation indication information may further include: eighth indication information used to determine a period of the one or more first sidelink transmission resources.

In an embodiment, the time interval determined from the sixth indication information may be equal to a period of the one or more first sidelink transmission resources when the one or more first sidelink transmission resources configured in the first configuration information are one or more configured grant based transmission resources.

In an embodiment, the first configuration information may be used to configure a plurality of first transmission resources when the first sidelink transmission resources configured in the first configuration information are dynamically allocated transmission resources, and the time interval determined from the sixth indication information may be determined based on the plurality of first sidelink transmission resources configured in the first configuration information.

In an embodiment, the receiving unit 1301 may be further configured to receive third configuration information or first control information transmitted by the network device, the third configuration information being used to configure a third sidelink transmission resource, the first control information being used to indicate release of the one or more first sidelink transmission resources. The transmitting unit 1302 may be further configured to transmit ninth indication information used to indicate that no resource is reserved by the first terminal device.

In one embodiment, the SCI may be used to indicate a transmission parameter and a transmission resource of the PSSCH, and the PSSCH may be used to transmit sidelink data of an aperiodic service. That is, the sidelink data transmitted in the PSSCH scheduled by the SCI corresponds to the aperiodic service.

In an embodiment, the SCI may be used to indicate a transmission parameter and a transmission resource of the PSSCH, and the PSSCH may be used to transmit sidelink data of a periodic service. That is, the sidelink data transmitted in the PSSCH scheduled by the SCI corresponds to the periodic service.

In an implementation, the transmitting unit 1302 may be further configured to transmit tenth indication information and/or a first resource request message to the network device in response to detecting that the one or more first sidelink transmission resources are occupied or reserved by a second terminal device.

Here, the tenth indication information is used to indicate that the one or more first sidelink transmission resources are occupied or reserved, and the first resource request message is used to request the network device to reallocate one or more sidelink transmission resources for the first terminal device.

In an embodiment, the apparatus may further include:
a determining unit 1303 configured to determine a set of available resources; and
a reporting unit 1304 configured to report the set of available resources to the network device.

In an embodiment, the determining unit may be configured to determine the set of available resources by means of sensing.

In an embodiment, the apparatus may further include:
an obtaining unit 1305 configured to obtain a fourth sidelink transmission resource in response to detecting that the one or more first sidelink transmission resources are occupied or reserved by a second terminal device.

The transmitting unit 1302 may be configured to transmit the resource reservation indication information on the fourth sidelink transmission resource.

In an embodiment, the obtaining unit 1305 may be configured to receive fourth configuration information transmitted by the network device, the fourth configuration information being used to indicate the fourth sidelink transmission resource.

In one embodiment, the obtaining unit 1305 may be configured to obtain resource pool configuration information, and determine a second resource pool based on the resource pool configuration information; and determine the fourth sidelink transmission resource from the second resource pool by means of sensing or random selection.

In an embodiment, the obtaining unit 1305 may be configured to transmit a second resource request message to the network device, and receive fourth configuration information transmitted by the network device, the fourth configuration information being used to indicate the fourth sidelink transmission resource.

It can be appreciated by those skilled in the art that, for relevant description of the above resource sharing apparatus according to the embodiment of the present disclosure, reference can be made to the relevant description of the resource sharing method according to the embodiment of the present disclosure.

Figure 14:
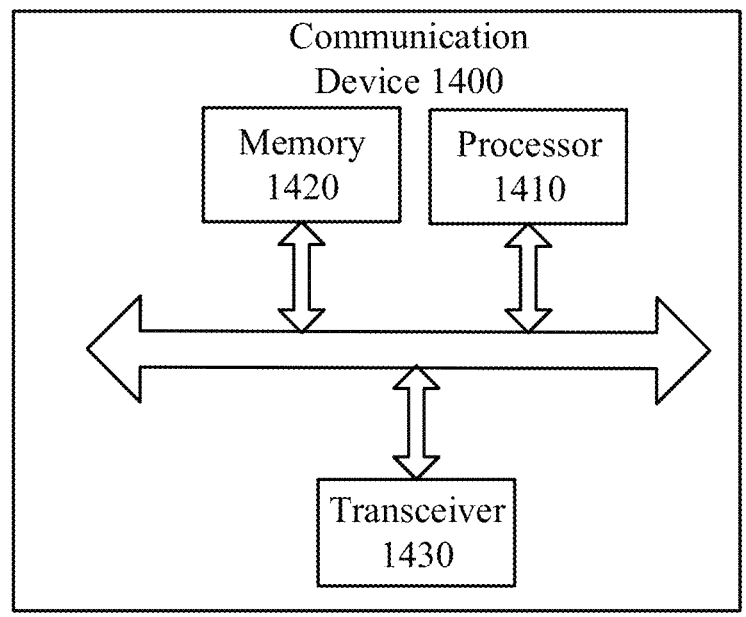
FIG. 14 is a schematic diagram showing a structure of a communication device according to an embodiment of the present disclosure.

FIG. 14 is a schematic diagram showing a structure of a communication device 1400 according to an embodiment of the present disclosure. The communication device may be a terminal device or a network device. The communication device 1400 shown in FIG. 14 includes a processor 1410, and the processor 1410 can invoke and execute a computer program from a memory to perform the method according to any of the embodiments of the present disclosure.

Optionally, as shown in FIG. 14, the communication device 1400 may further include a memory 1420. The processor 1410 can invoke and execute a computer program from the memory 1420 to perform the method according to any of the embodiments of the present disclosure.

The memory 1420 may be a separate device independent of the processor 1410, or may be integrated in the processor 1410.

Optionally, as shown in FIG. 14, the communication device 1400 may further include a transceiver 1430. The processor 1410 can control the transceiver 1430 to communicate with other devices, and in particular to transmit information or data to other devices or receive information or data transmitted by other devices.

Here, the transceiver 1430 may include a transmitter and a receiver. The transceiver 1430 may further include one or more antennas.

Optionally, the communication device 1400 may be the network device in the embodiment of the present disclosure, and the communication device 1400 can perform corresponding procedures implemented by the network device in the method according to any of the embodiments of the present disclosure. Details thereof will be omitted here for simplicity.

Optionally, the communication device 1400 may be the mobile terminal/terminal device in the embodiment of the present disclosure, and the communication device 1400 can perform corresponding procedures implemented by the mobile terminal/terminal device in the method according to any of the embodiments of the present disclosure. Details thereof will be omitted here for simplicity.

Figure 15:
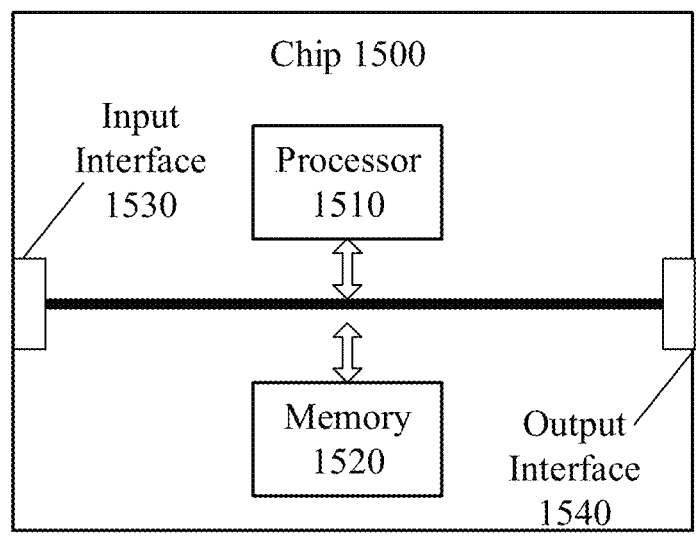
FIG. 15 is a schematic diagram showing a structure of a chip according to an embodiment of the present disclosure.

FIG. 15 is a schematic diagram showing a structure of a chip according to an embodiment of the present disclosure. The chip 1500 shown in FIG. 15 includes a processor 1510, and the processor 1510 can invoke and run a computer program from a memory to implement the method in any of the embodiments of the present disclosure.

Optionally, as shown in FIG. 15, the chip 1500 may further include a memory 1520. The processor 1510 can invoke and run a computer program from the memory 1520 to implement the method in any of the embodiments of the present disclosure.

The memory 1520 may be a separate device independent from the processor 1510, or may be integrated in the processor 1510.

Optionally, the chip 1500 may further include an input interface 1530. The processor 1510 can control the input interface 1530 to communicate with other devices or chips, and in particular, obtain information or data transmitted by other devices or chips.

Optionally, the chip 1500 may further include an output interface 1540. The processor 1510 can control the output interface 1540 to communicate with other devices or chips, and in particular, output information or data to other devices or chips.

Optionally, the chip can be applied to the network device in the embodiment of the present disclosure, and the chip can implement the corresponding processes implemented by the network device in the various methods of the embodiments of the present disclosure. For the sake of brevity, details thereof will be omitted here.

Optionally, the chip can be applied to the mobile terminal/terminal device in the embodiment of the present disclosure, and the chip can implement the corresponding process implemented by the mobile terminal/terminal device in each method of the embodiment of the present disclosure. For the sake of brevity, details thereof will be omitted here.

It can be appreciated that the chip in the embodiment of the present disclosure may also be referred to as a system-level chip, a system-chip, a chip system, or a system-on-chip.

Figure 16:
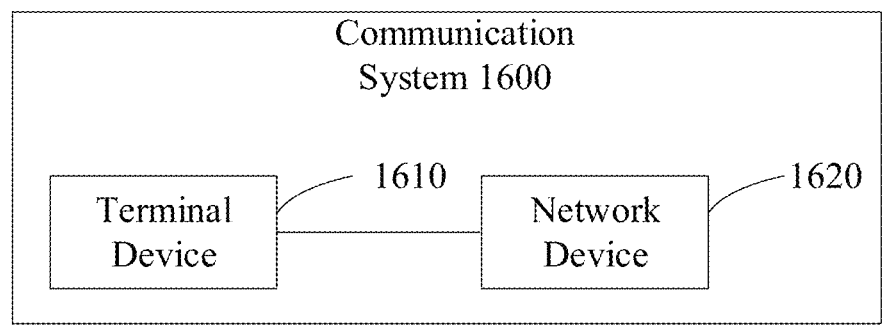
FIG. 16 is a schematic block diagram of a communication system according to an embodiment of the present disclosure.

FIG. 16 is a schematic block diagram of a communication system 1600 according to an embodiment of the present disclosure. As shown in FIG. 16, the communication system 1600 includes a terminal device 1610 and a network device 1620.

Here, the terminal device 1610 can be configured to implement the corresponding functions implemented by the terminal device in the above method, and the network device 1620 can be configured to implement the corresponding functions implemented by the network device in the above method. For the sake of brevity, details thereof will be omitted here.

It is to be noted that the processor in the embodiment of the present disclosure may be an integrated circuit chip with signal processing capability. In an implementation, the steps of the above method embodiments can be implemented by hardware integrated logic circuits in a processor or instructions in the form of software. The processor can be a general purpose processor, a Digital Signal Processor (DSP), an Application Specific Integrated Circuit (ASIC), a Field Programmable Gate Array (FPGA) or another programmable logic device, a discrete gate or transistor logic device, or a discrete hardware component. The methods, steps, and logical block diagrams disclosed in the embodiments of the present disclosure can be implemented or performed. The general purpose processor may be a microprocessor or any conventional processor. The steps of the methods disclosed in the embodiments of the present disclosure may be directly embodied as being performed and completed by a hardware decoding processor, or by a combination of hardware and software modules in the decoding processor. The software modules can be located in a known storage medium in the related art, such as random access memory, flash memory, read-only memory, programmable read-only memory, electrically erasable programmable memory, or register. The storage medium can be located in the memory, and the processor can read information from the memory and perform the steps of the above methods in combination with its hardware.

It can be appreciated that the memory in the embodiments of the present disclosure may be a transitory memory or a non-transitory memory, or may include both transitory and non-transitory memories. Here, the non-transitory memory may be a Read-Only Memory (ROM), a Programmable ROM (PROM), an Erasable PROM (EPROM), an Electrically EPROM (EEPROM), or a flash memory. The transitory memory may be a Random Access Memory (RAM), which is used as an external cache. As illustrative, rather than limiting, many forms of RAMs are available, including for example Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM)), and Direct Rambus RAM (DR RAM). It is to be noted that the memory used for the system and method described in the present disclosure is intended to include, but not limited to, these and any other suitable types of memories.

It can be appreciated that the above memories are exemplary only, rather than limiting the present disclosure. For example, the memory in the embodiment of the present disclosure may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch Link DRAM (SLDRAM), or a Direct Rambus RAM (DR RAM). That is, the memory in the embodiments of the present disclosure is intended to include, but not limited to, these and any other suitable types of memories.

An embodiment of the present disclosure also provides a computer-readable storage medium for storing a computer program.

Optionally, the computer-readable storage medium can be applied to the network device in the embodiment of the present disclosure, and the computer program can cause a computer to perform corresponding procedures implemented by the network device in the method according to any of the embodiments of the present disclosure. Details thereof will be omitted here for simplicity.

Optionally, the computer-readable storage medium can be applied to the mobile terminal/terminal device in the embodiment of the present disclosure, and the computer program can cause a computer to perform corresponding procedures implemented by the mobile terminal/terminal device in the method according to any of the embodiments of the present disclosure. Details thereof will be omitted here for simplicity.

An embodiment of the present disclosure also provides a computer program product including computer program instructions.

Optionally, the computer program product can be applied to the network device in the embodiment of the present disclosure, and the computer program instructions can cause a computer to perform corresponding procedures implemented by the network device in the method according to any of the embodiments of the present disclosure. Details thereof will be omitted here for simplicity.

Optionally, the computer program product can be applied to the mobile terminal/terminal device in the embodiment of the present disclosure, and the computer program instructions can cause a computer to perform corresponding procedures implemented by the mobile terminal/terminal device in the method according to any of the embodiments of the present disclosure. Details thereof will be omitted here for simplicity.

An embodiment of the present disclosure also provides a computer program.

Optionally, the computer program can be applied to the network device in the embodiment of the present disclosure. The computer program, when executed on a computer, can cause the computer to perform corresponding procedures implemented by the network device in the method according to any of the embodiments of the present disclosure. Details thereof will be omitted here for simplicity.

Optionally, the computer program can be applied to the mobile terminal/terminal device in the embodiment of the present disclosure. The computer program, when executed on a computer, can cause the computer to perform corresponding procedures implemented by the mobile terminal/terminal device in the method according to any of the embodiments of the present disclosure. Details thereof will be omitted here for simplicity.

It can be appreciated by those skilled in the art that units and algorithm steps in the examples described in connection with the embodiments disclosed herein can be implemented in electronic hardware or any combination of computer software and electronic hardware. Whether these functions are executed by hardware or software depends on specific applications and design constraint conditions of the technical solutions. Those skilled in the art may use different methods for each specific application to implement the described functions, and such implementation is to be encompassed by the scope of this disclosure.

Those skilled in the art can clearly understand that, for the convenience and conciseness of the description, for the specific operation processes of the systems, devices, and units described above, reference can be made to the corresponding processes in the foregoing method embodiments, and details thereof will be omitted here.

In the embodiments of the present disclosure, it can be appreciated that the disclosed systems, devices, and methods may be implemented in other ways. For example, the device embodiments described above are illustrative only. For example, the divisions of the units are only divisions based on logical functions, and there may be other divisions in actual implementations. For example, more than one unit or component may be combined or integrated into another system, or some features can be ignored or omitted. In addition, the mutual coupling or direct coupling or communicative connection as shown or discussed may be indirect coupling or communicative connection between devices or units via some interfaces which may be electrical, mechanical, or in any other forms.

The units described as separate components may or may not be physically separated, and the components shown as units may or may not be physical units, that is, they may be co-located or distributed across a number of network elements. Some or all of the units may be selected according to actual needs to achieve the objects of the solutions of the embodiments.

In addition, the functional units in the embodiments of the present disclosure may be integrated into one processing unit, or alternatively be separate physical modules, or two or more units may be integrated into one unit.

When the function is implemented in the form of a software functional unit and sold or used as a standalone product, it can be stored in a computer-readable storage medium. Based on this understanding, all or part of the technical solutions according to the present disclosure, or the part thereof that contributes to the prior art, can be embodied in the form of a software product. The computer software product may be stored in a storage medium and contain instructions to cause a computer device, such as a personal computer, a server, or a network device, etc., to perform all or part of the steps of the method described in each of the embodiments of the present disclosure. The storage medium may include various mediums capable of storing program codes, such as a Universal Serial Bus flash drive, a mobile hard disk, a Read-Only Memory (ROM), a Random Access Memory (RAM), a magnetic disk, an optical disc, or any other medium capable of storing program codes.

While the specific embodiments of the present disclosure have been described above, the protect scope of the present disclosure is not limited to these embodiments. Various variants and alternatives can be easily conceived by any of those skilled in the art without departing from the technical scope of the present disclosure. Therefore, these variants and alternatives are to be encompassed by the protect scope of present disclosure as defined by the claims as attached.

What is claimed is:

1. A resource sharing method, comprising:
receiving, by a first terminal device, first configuration information transmitted by a network device, the first configuration information being used to configure one or more first sidelink transmission resources; and
transmitting, by the first terminal device, resource reservation indication information on a sidelink, the resource reservation indication information being used to indicate that the one or more first sidelink transmission resources are reserved by the first terminal device, and
the method further comprising:
obtaining, by the first terminal device, a fourth sidelink transmission resource in response to detecting that the one or more first sidelink transmission resources are occupied or reserved by a second terminal device, and transmitting the resource reservation indication information on the fourth sidelink transmission resource,
wherein said obtaining, by the first terminal device, the fourth sidelink transmission resource comprises:

obtaining, by the first terminal device, resource pool configuration information, and determining a second resource pool based on the resource pool configuration information; and determining, by the first terminal device, the fourth sidelink transmission resource from the second resource pool by means of sensing or random selection.

2. The method according to claim 1, wherein the resource reservation indication information is carried in Sidelink Control Information (SCI).

3. The method according to claim 2, wherein the SCI further carries at least one of:

fifth indication information used to indicate that the one or more first sidelink transmission resources are allocated by the network device or that the first terminal device is operating in a first mode; wherein the first terminal device uses one or more sidelink transmission resources allocated by the network device when operating in the first mode;

sixth indication information used to determine a time interval between the one or more reserved first sidelink transmission resources and a transmission resource for transmitting the resource reservation indication information; and seventh indication information used to determine a number of times the one or more first sidelink transmission resources are reserved.

4. The method according to claim 1, further comprising:

receiving, by the first terminal device, third configuration information or first control information transmitted by the network device, the third configuration information being used to configure a third sidelink transmission resource, the first control information being used to indicate release of the one or more first sidelink transmission resources; and transmitting, by the first terminal device, ninth indication information used to indicate that no resource is reserved by the first terminal device.

5. A terminal device, comprising a processor and a memory, wherein the memory is configured to store a computer program, and the processor is configured to invoke and execute the computer program stored in the memory to perform the method according to claim 1.

6. A chip, comprising a processor configured to invoke and execute a computer program from a memory, to cause an apparatus provided with the chip to perform the method according to claim 1.

7. A non-transitory computer-readable storage medium, configured to store a computer program that causes a computer to perform the method according to claim 1.

* * * * *